United States Patent [19]

Guers

[11] Patent Number: 4,688,951
[45] Date of Patent: Aug. 25, 1987

[54] ROLLER BEARING WITH CONTACTLESS TRANSMISSION OF ELECTRIC SIGNALS

[75] Inventor: Roger Guers, Seynod, France

[73] Assignee: S.N.R. Roulements, Annecy, France

[21] Appl. No.: 914,002

[22] Filed: Oct. 1, 1986

[30] Foreign Application Priority Data

Oct. 7, 1985 [FR] France ................................ 85 14801

[51] Int. Cl.⁴ ............................................. F16C 33/58
[52] U.S. Cl. ..................................... 384/446; 384/448
[58] Field of Search .............. 384/446, 448, 492, 490, 384/513; 310/67, 105, 168

[56] References Cited

U.S. PATENT DOCUMENTS

| | | | |
|---|---|---|---|
| 3,573,520 | 4/1971 | Dorshimer | 310/67 |
| 4,063,786 | 12/1977 | Rall | 384/448 |
| 4,069,435 | 1/1978 | Wannerskog et al. | 384/446 |
| 4,446,391 | 5/1984 | Sekine et al. | 310/105 |

FOREIGN PATENT DOCUMENTS 2558223  7/1985  France .
2574501  6/1986  France .

*Primary Examiner*—Lenard A. Footland
*Attorney, Agent, or Firm*—Oblon, Fisher, Spivak, McClelland, & Maier

[57] ABSTRACT

Two parts of a roller bearing are separated by a gap and rotate in relation to one another, one of which carries a circuit through which a current passes. The circuit is rigidly connected to the rotating ring of the roller bearing and moves in front of a disk carried by the stationary ring on which an electromagnetic field probe is mounted.

6 Claims, 7 Drawing Figures

ROLLER BEARING WITH CONTACTLESS TRANSMISSION OF ELECTRIC SIGNALS

BACKGROUND OF THE INVENTION

1. Field of the Invention

The invention relates to a roller bearing with a device for contactless transmission of electric signals, of the type having two parts separated by a gap and rotating in relation to one another, one of which carries a circuit through which a current travels and the other a probe for reading a magnetic field.

2. Background of the Related Art

Numerous devices having rotating contacts are already known which use sliding contacts having rings and brushes, or rotating contacts using a mercury bath. These devices are suitable for limited rotation speeds and require periodic maintenance.

Contactless transmissions between a sensor mounted on a rotating part and a stationary measuring system are also known. In these cases, the electrical transmission can be either capacitive (rotating capacitor), inductive (concentric transformer), or performed by radio wave (FR patent publication No. A 2 428 821).

All these devices are generally bulky and very costly. In addition, they must be added to existing mechanical systems because they provide only the transmission function.

SUMMARY OF THE INVENTION

The object of the invention is to provide a device for performing a transmission of electric signals inside a roller bearing, without mechanical contact, without the bearing being an obstacle to transmission.

The invention therefore proposes a device capable of simultaneously providing for the rotation function and the function of transmission of signals, resulting in a reduction in the cost, weight and bulk of the device.

The elements of the invention incorporated into the roller bearing thus benefit from the mechanical precision and protection against outside agents that the roller bearing normally offers and are suited to mass production, as necessitated, for example, by the automobile industry.

The invention proposes a device for transmission of electric signals by a magnetic field, through a roller bearing, without the relative angular movements of the elements of the roller bearing disturbing the accuracy of the transmission.

According to the invention, a circuit for creating a magnetic field is rigidly connected to the rotating ring of the roller bearing and moves in front of a disk carried by the stationary ring on which a probe for detecting the magnetic field is mounted.

In such a roller bearing, the rotating circuit can be made one or more windings or in the form of a printed or integrated silicon circuit through which passes an amplified and optionally digitally coded signal. The electric signal which passes through it is transformed into a magnetic field that can be detected by a probe, whose instantaneous value is thus the image of the physical magnitude sensed.

Furthermore, when the magnetic field probe is designed in the form of a Hall probe, with a magnetoresistor, a magnetodiode or with a magnetotransistor, the analog or digital output signal can be made independent of the movement of the magnetic field during the rotation of the rotating ring.

When the physical magnitude is transformed into a coded digital signal, this signal is transmitted in the form of pulses of constant amplitude with one or more transmitting coils creating a pulsed magnetic field read by an all or nothing digital output probe and the coding of the signal makes it possible to eliminate possible sources of error (due to temperatures, mechanical play, etc.).

The energy necessary for the circuit connected to the rotating part of the roller bearing can be provided by a battery or a minigenerator incorporated into the roller bearing, the different sources of energy thus being rechargeable.

Actually, since the bearing constitutes a rotating system, the coil or coils rotating in front of the magnets can be the source of an induced voltage that can be used to feed a current to an electronic circuit or to recharge the source of energy.

According to an embodiment of the invention, associated with a set of deflectors of the roller bearing are the means for transmission of the signal (coil+probe) and the mean generating a current (magnet+coil). In this way, the transmission of an all or nothing signal can be achieved, for example, in order to determine the inflation threshold of the tires of a vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
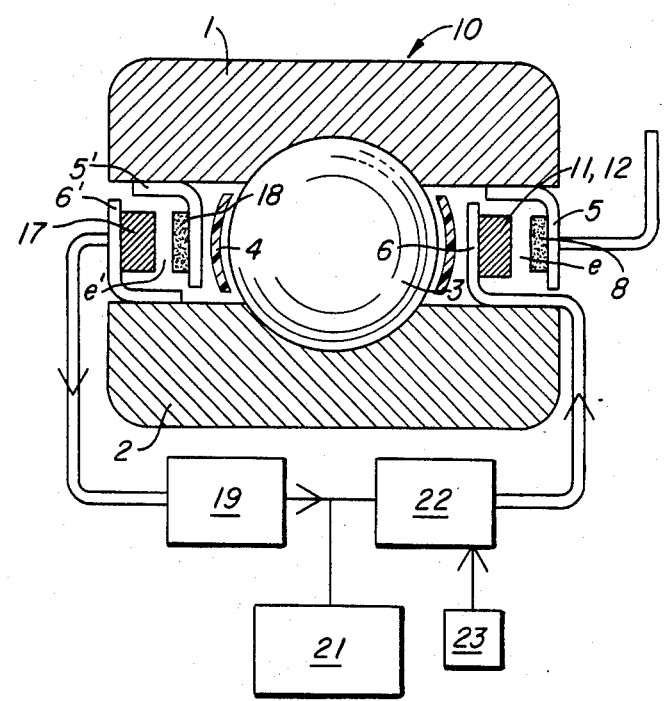
FIG. 1 is a schematic representation of a roller bearing whose right part carries a device for transmission of a signal emitted by a sensor and whose left part carries an electric generator.

FIG. 1 schematically shows a roller bearing 10 consisting of a first or stationary outer ring 1 and a second or rotating inner ring 2, although it is understood that a roller bearing with a rotating outer ring and a stationary inner ring could just as well be designed.

Rolling bodies 3 mounted in a cage 4 are arranged between rings 1 and 2, as is well known.

Rings 1 and 2 respectively carry stationary deflectors 5 and 5' and rotating deflectors 6 and 6', respectively separated by an axial gap e or e'.

On the right part of the roller bearing, the stationary deflector 5 consists of a disk carrying a suitable probe 8 for detecting a magnetic field. The probe 8 can deliver a signal as a function of the detected magnetic field.

Figure 2:
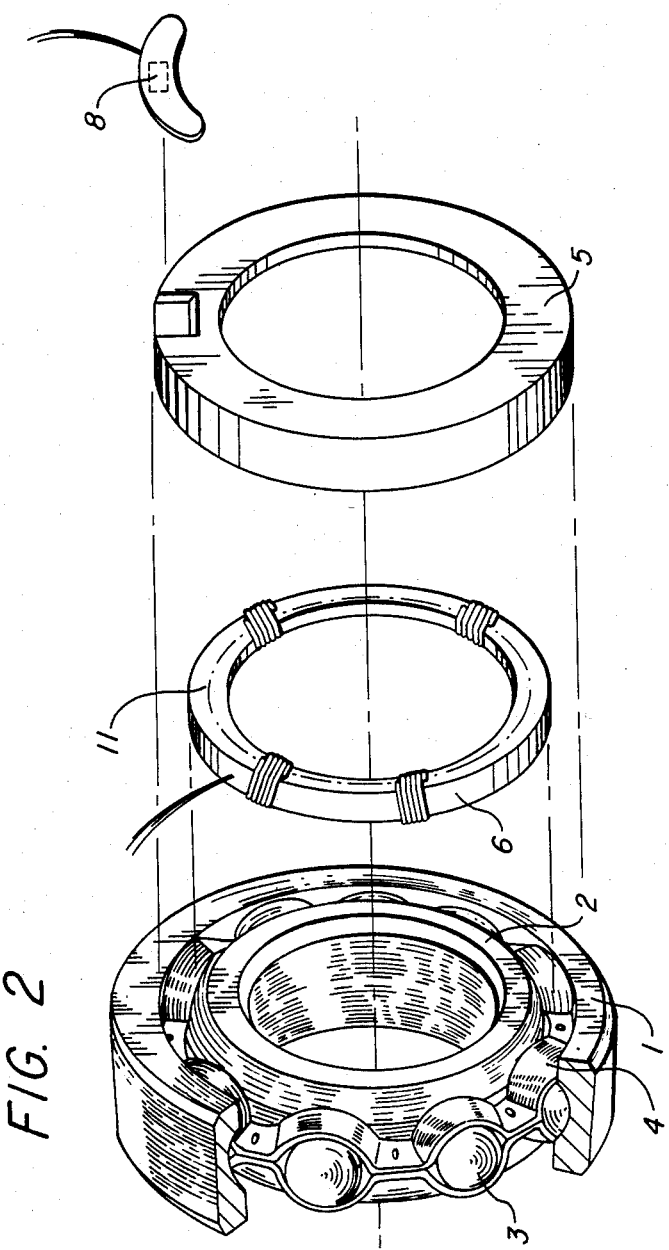
FIG. 2 is an exploded view of an embodiment that employs a circular coiled circuit.
Figure 3:
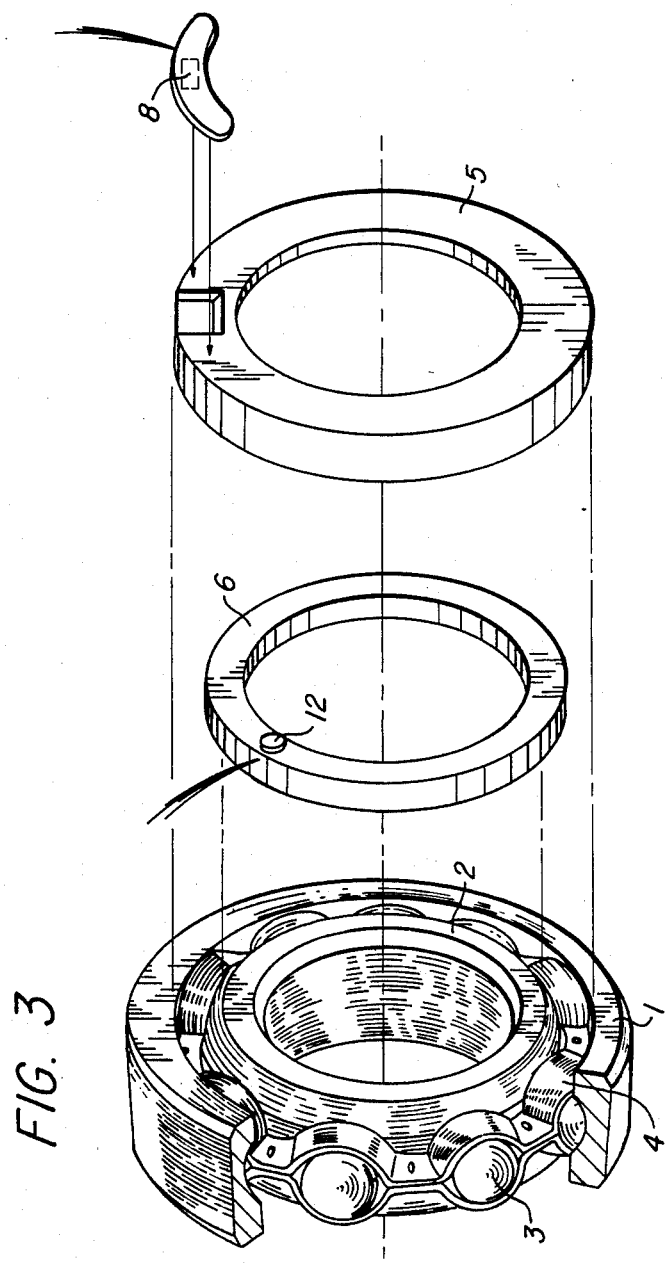
FIG. 3 is a variant embodiment that employs a coil mounted on a ring.

Rotating deflector 6 carries a circuit which can consist of: a winding 11 (with or without ferrite core) as shown in FIG. 2, or a coil 12 (with or without ferrite core) as shown in FIG. 3.

Figure 4:
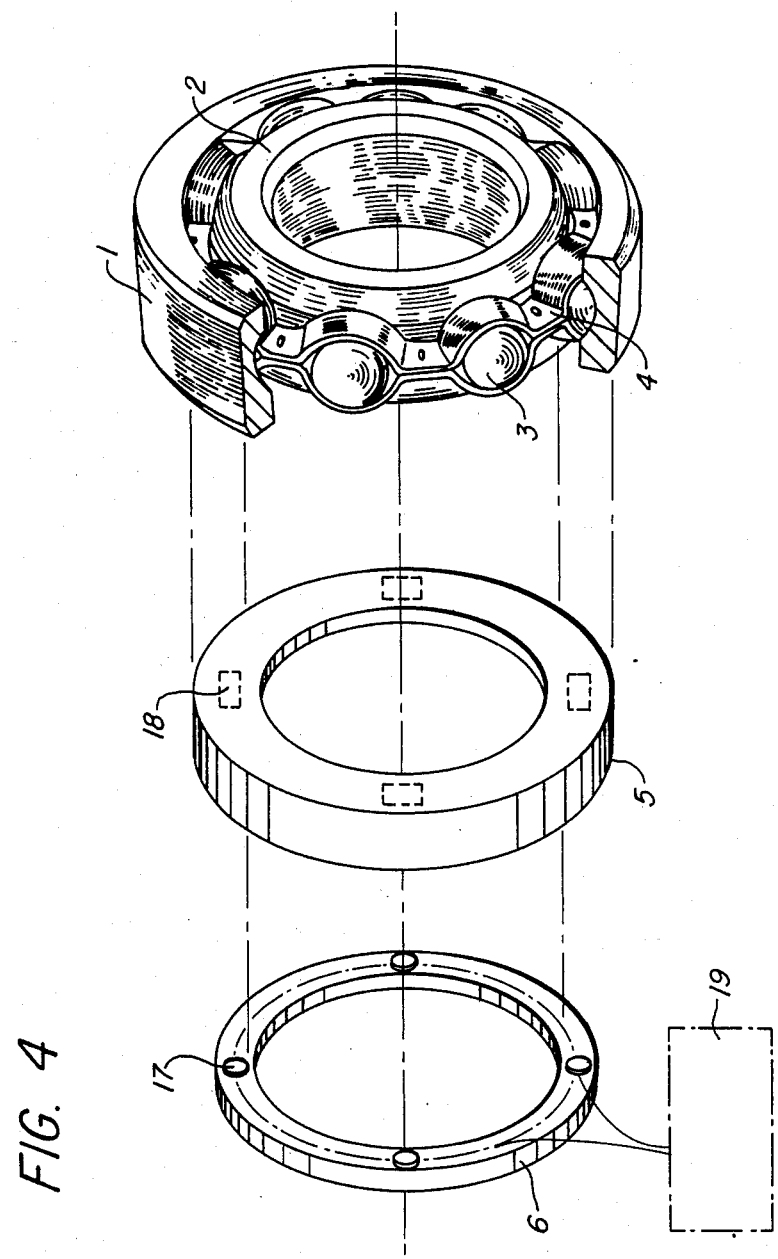
FIG. 4 is an exploded view of a device for generating alternating current integrated into the roller bearing as shown schematically in FIG. 1.

On the left part of the roller bearing, a voltage generator has been shown as consisting of at least one coil (17) mounted on deflector 6' to move jointly with rotating ring 2 in front of at least one magnet 18 connected to stationary ring 1 via deflector 5'. Coils 17 rotating in front of magnets 18 create an induced voltage which results in the transmission of a current to the winding 11 or coil 12 via an electronic circuit including a voltage regulator 19, which supplies an amplifier 22 or recharges a battery 21. FIG. 4 illustrates an embodiment of such a generator having four magnets 18 and four coils 17.

The amplifier 22 receives a signal from a sensor 23 and supplies the signal to coil 11 or 12. Sensor 23, which may, for example, be a tire pressure or temperature sensor, is fixed to rotating ring 2 and together with the amplifier 22 acts as a means for regulating the current to the winding or coil 11 or 12.

Figure 5:
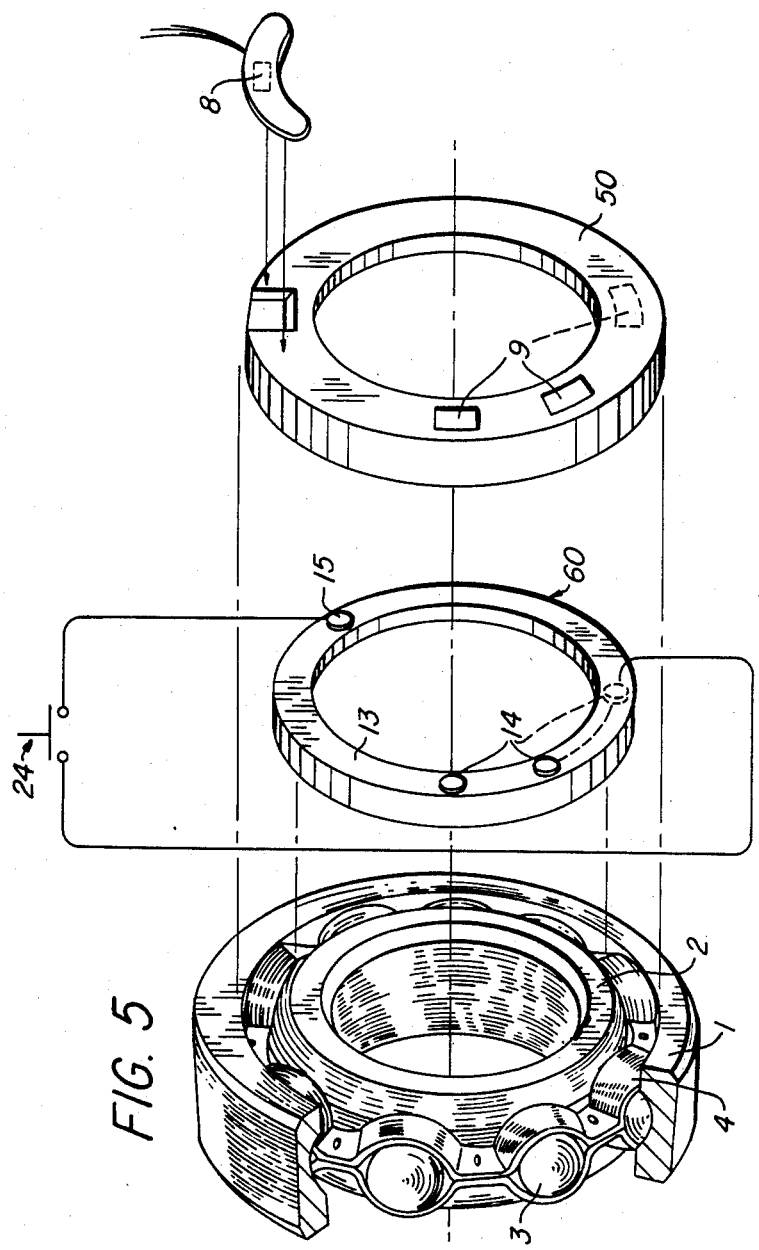
FIG. 5 is an exploded view of the device employing a generator as shown in FIG. 4 combined with the device according to FIG. 3.

FIG. 5 shows a variant of the roller bearing suited for transmission of an all or nothing (i.e., digital) signal. For this purpose, the circuit consists at least of one transmitting coil (three ar shown) 14 and a receiving coil 15. These coils are mounted on a deflector 60 connected to the rotating ring. Magnets 9 and a probe 8 for detecting a magnetic field are mounted on a deflector 50 connected to the stationary ring.

Transmitting coils 14 are excited by passing in front of the magnets 9 and the current so generated feeds receiving coil 15 which creates an induced magnetic field detected by probe 8. Transmitting and reeiving coils 14, 15 are connected in series with a regulating means in the form of a switch 24 and the transmission of data therebetween is conditioned on the previous closing of switch 24 whose operation can be controlled, by way of nonlimiting example, by a sensed pressure or temperature threshold of a motor vehicle tire.

Figure 6:
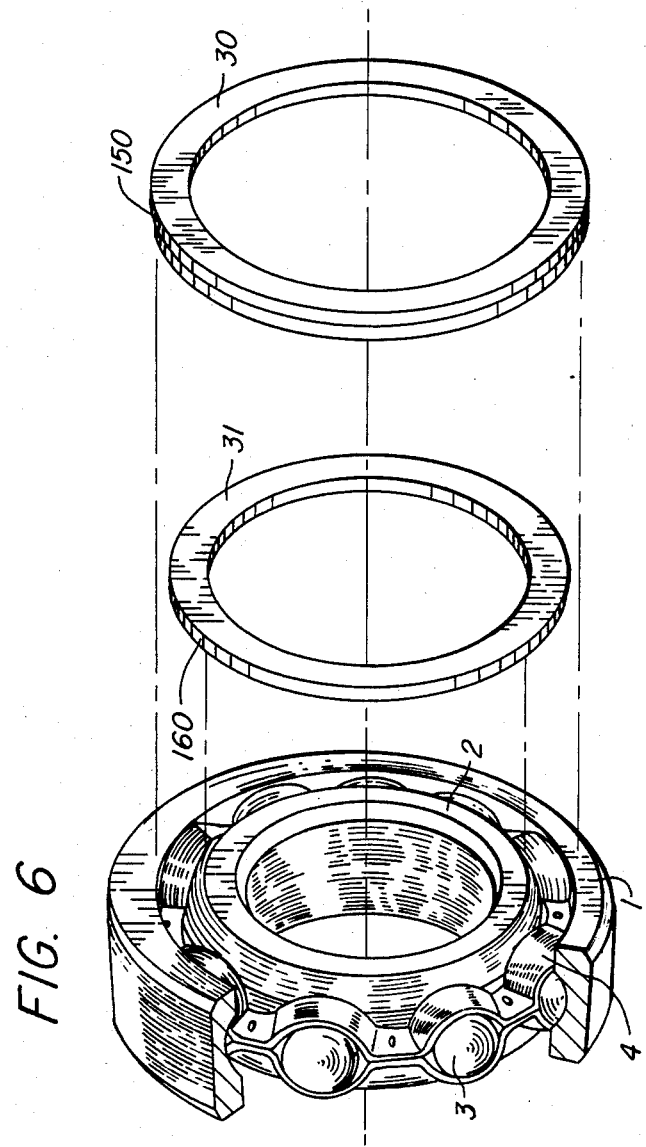
FIGS. 6 and 7 are respectively exploded views of roller bearings which carry devices for capacitive and inductive transmission having conductive paths and having coils.

FIG. 6 shows a variant of the roller bearing suited for transmission of an analog or mechnical high frequency signal.

.For this purpose, deflectors 150 and 160 respectively carry stationary 30 and rotating 31 conductive paths separated by a gap, which behave in the manner of plates of a capacitor.

Figure 7:
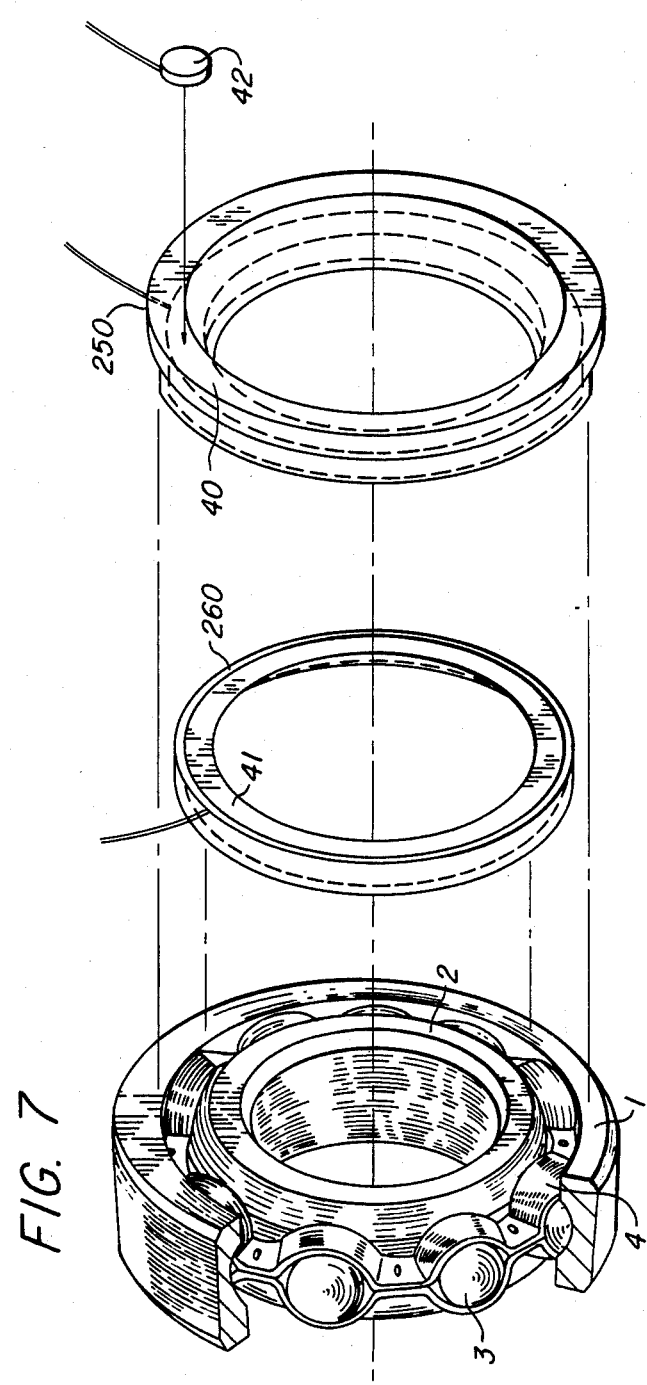

FIG. 7 shows a variant of the roller bearing suited for transmission of a signal by inductive means.

For this purpose, deflectors 250 and 260 respectively carry stationary 40 and rotating 41 coils which behave like a rotating transformer. In this case, stationary coil 40 performs the function of a stator receiving the signal and mobile coil 41 performs the function of the rotor transmitting the signal.

It should be noted that receiving coil 40 can consist, as desired, of a coil identical with transmitting coil 41 or of a group of single minicoils 42 coupled to one another.

From the description which has just been made, it is evident that the various components of the device for transmission of signals can easily be incorporated into the roller bearing or into its environment without requiring a substantial technological change of the roller bearing and without modifying its conventional structure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rolling bearing with contactless transmission of electric signals, comprising:
    a first rolling bearing ring;
    a second rolling bearing ring rotatable relative to said first ring;
    means fixed to said second ring for creating a magnetic field in response to the application of an electric current thereto;
    means for detecting a magnetic field fixed to said first ring at a position such that said means for detecting moves through a magnetic field created by said means for creating a magnetic field upon relative rotation of said first and second rings;
    at least one magnet fixed to said first ring;
    at least one electric coil fixed to said second ring at a position such that electric coil moves through a magnetic field of said magnet upon relative rotation of said first and second rings, whereby an electric current is produced; and
    means dependent on said produced electric current for regulating said means for creating a magnetic field, whereby said means for detecting a magnetic field is responsive to said means for regulating.

2. The rolling bearing of claim 1, wherein said means for regulating comprise sensor means having an amplifier fed by said produced electric current and means for supplying an amplified signal from said amplifier to said means for creating a magnetic field.

3. The rolling bearing of claim 1, wherein said means for regulating comprise means including an all or nothing switch for supplying said produced current to said means for creating a magnetic field, and sensor means for controlling said switch.

4. The rolling bearing of claim 1, wherein said means for creating a magnetic field and said means for detecting a magnetic field comprise a pair conductive paths respectively connected to said second and first rings and separated by a gap, whereby a capacitive system is formed.

5. The rolling bearing of claim 1, wherein said means for creating a magentic field and said means for detecting a magnetic field comprises at least one conductive coil fixed to each of said first and second rings to form an inductive transmission system.

6. The rolling bearing of claim 5, wherein said at least one conductive coil comprises a single conductive coil.

* * * * *